US007143949B1

(12) United States Patent
Hannigan

(10) Patent No.: US 7,143,949 B1
(45) Date of Patent: Dec. 5, 2006

(54) INTERNET-LINKING SCANNER

(75) Inventor: Brett T. Hannigan, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 09/543,125

(22) Filed: Apr. 5, 2000

(51) Int. Cl.
*G06K 9/22* (2006.01)

(52) U.S. Cl. .................... 235/462.45; 235/462.31; 235/462.32; 235/472.02

(58) Field of Classification Search ............. 235/435, 235/447, 462.31, 462.32, 472.02, 472.03
See application file for complete search history.

(56) References Cited

U.S. PATENT DOCUMENTS

| | | | |
|---|---|---|---|
| 5,206,491 A * | 4/1993 | Katoh et al. | |
| 5,260,554 A * | 11/1993 | Grodevant | ................. 235/462 |
| 5,448,050 A | 9/1995 | Kostizak | |
| 5,574,804 A | 11/1996 | Olschafskie et al. | |
| 5,635,697 A | 6/1997 | Shellhammer et al. | |
| 5,673,316 A | 9/1997 | Auerbach et al. | |
| 5,726,685 A | 3/1998 | Kuth et al. | |
| 5,742,845 A | 4/1998 | Wagner | |
| 5,761,686 A | 6/1998 | Bloomberg | |
| 5,778,102 A | 7/1998 | Sandford, II et al. | |
| 5,790,703 A * | 8/1998 | Wang | ......................... 382/212 |
| 5,862,260 A | 1/1999 | Rhoads | |
| 5,892,900 A | 4/1999 | Ginter et al. | |
| 5,900,608 A | 5/1999 | Iida | |
| 5,909,209 A | 6/1999 | Dickinson | |
| 5,915,027 A | 6/1999 | Cox et al. | |
| 5,994,710 A | 11/1999 | Knee et al. | |
| 6,036,094 A | 3/2000 | Goldman et al. | |
| 6,052,486 A | 4/2000 | Knowlton et al. | |
| 6,142,376 A * | 11/2000 | Cherry et al. | ......... 235/462.14 |
| 6,199,753 B1 * | 3/2001 | Tracy | ......................... 235/375 |
| 6,205,249 B1 * | 3/2001 | Moskowitz | ................. 382/232 |
| 6,338,434 B1 * | 1/2002 | Wilz, Sr. et al. | ........ 235/462.01 |
| 6,442,284 B1 | 8/2002 | Gustafson et al. | |
| 6,516,079 B1 * | 2/2003 | Rhoads et al. | .............. 382/100 |
| 6,553,127 B1 * | 4/2003 | Kurowski | .................... 382/100 |
| 6,650,761 B1 | 11/2003 | Rodriguez et al. | |
| 6,681,028 B1 | 1/2004 | Rodriguez et al. | |
| 2001/0040979 A1 | 11/2001 | Davidson et al. | |
| 2004/0156529 A1 | 8/2004 | Davis et al. | |

FOREIGN PATENT DOCUMENTS

WO    WO009803923 A1 *    1/1998

(Continued)

OTHER PUBLICATIONS

Allen, Ross R. et al., "Processes for Freehand Image Capture: HP CapShare Technology," The Society for Imaging Science & Technology PICS Conference, pp. 43-46, Mar. 26, 2000.

(Continued)

*Primary Examiner*—Thien M. Le
*Assistant Examiner*—Daniel A. Hess
(74) *Attorney, Agent, or Firm*—Digimarc Corporation

(57) ABSTRACT

A scanner is programmed to extract a machine-readable identifier (e.g., encoded in watermark or barcode form) from an object, and transmit same to a remote computer (e.g., over the Internet). The remote computer responds with supplemental information or e-commerce opportunities relating to the scanned object. This information may be presented on an LCD display built-in to the scanner. In some embodiments, auxiliary CCD sensors are provided in addition to the scanner's usual image sensor. These auxiliary sensors can be employed for various purposes, including identifying surface texture characteristics so that corresponding filtering/processing of scan data can be performed; detecting affine transformations of the object being imaged so appropriate compensations can be applied, etc., etc.

13 Claims, 2 Drawing Sheets

Grid Orientation Under
CCD 18a

Grid Orientation Under
CCD 18b

FOREIGN PATENT DOCUMENTS

WO      WO9953428      10/1999

OTHER PUBLICATIONS

Agilent Technologies, "Solid-State Optical Mouse Lens" Technical Data, 2000.

Agilent Technologies, "Solid-State Optical Mouse Sensor with PS/2 and Quadrature Outputs" Application Note 1179, 2000.

Agilent Technologies, "Solid-State Optical Mouse Sensor with PS/2 and Quadrature Outputs" Technical Data, 2000.

* cited by examiner

Grid Orientation Under
CCD 18a

Grid Orientation Under
CCD 18b

INTERNET-LINKING SCANNER

BACKGROUND AND SUMMARY OF THE INVENTION

Various technologies have been proposed for linking from physical media (e.g., magazine advertisements) to the Internet.

The present assignee offers a service (MediaBridge™) that relies on digital watermarking technology to surreptitiously convey a plural bit identifier within the artwork of an advertisement. This identifier is read by software in a user's computer and forwarded to a remote database. The remote database identifies a URL corresponding to the identifier, and provides the URL back to the user's computer—permitting a browser on the user's computer to display the URL-identified web page. This system, and the associated digital watermarking technology, is further detailed in U.S. Pat. No. 5,862,260, in copending application Ser. Nos. 09/343,104, 09/503,881 (now U.S. Pat. No. 6,614,914), 60/158,015, 60/163,332, 60/164,619, and in application Ser. No. 09/531,076, filed Mar. 20, 2000, entitled SYSTEM FOR LINKING FROM OBJECTS TO REMOTE RESOURCES.

Another approach relies on publication of bar code identifiers in advertisements. A barcode reading pen, or similar device, is used to sense the barcode, which is then processed to provide a corresponding URL. Such technology is disclosed, e.g., in the present assignee's application Ser. No. 09/452,021, and in issued U.S. Pat. Nos. 5,978,773, 5,971,277, 5,918,214, 5,933,829, and 5,905,251.

In accordance with the present invention, a scanner is provided with means to discern an identifier (encoded as a digital watermark, a barcode, or both) from scan data. The scanner can provide this identifier to an auxiliary device (e.g., a local or remote computer), or can utilize the information internally (e.g., by presenting same to the user).

In a particular implementation, a hand scanner—such as the HP CapShare 920 scanner—is adapted (i.e., programmed) for this purpose.

The foregoing and additional features and advantages of the present invention will be more readily apparent from the following detailed description, which proceeds with reference to the accompanying drawings.

DETAILED DESCRIPTION

The reader is presumed familiar with the workings of the HP CapShare scanner. Such information has been published in the technical literature, e.g., Allen, Ross R. et al, "Processes for Freehand Image Capture: HP CapShare Technology," The Society for Imaging Science & Technology PICS Conference, pp. 43–46, Mar. 26, 2000.

Figure 1:
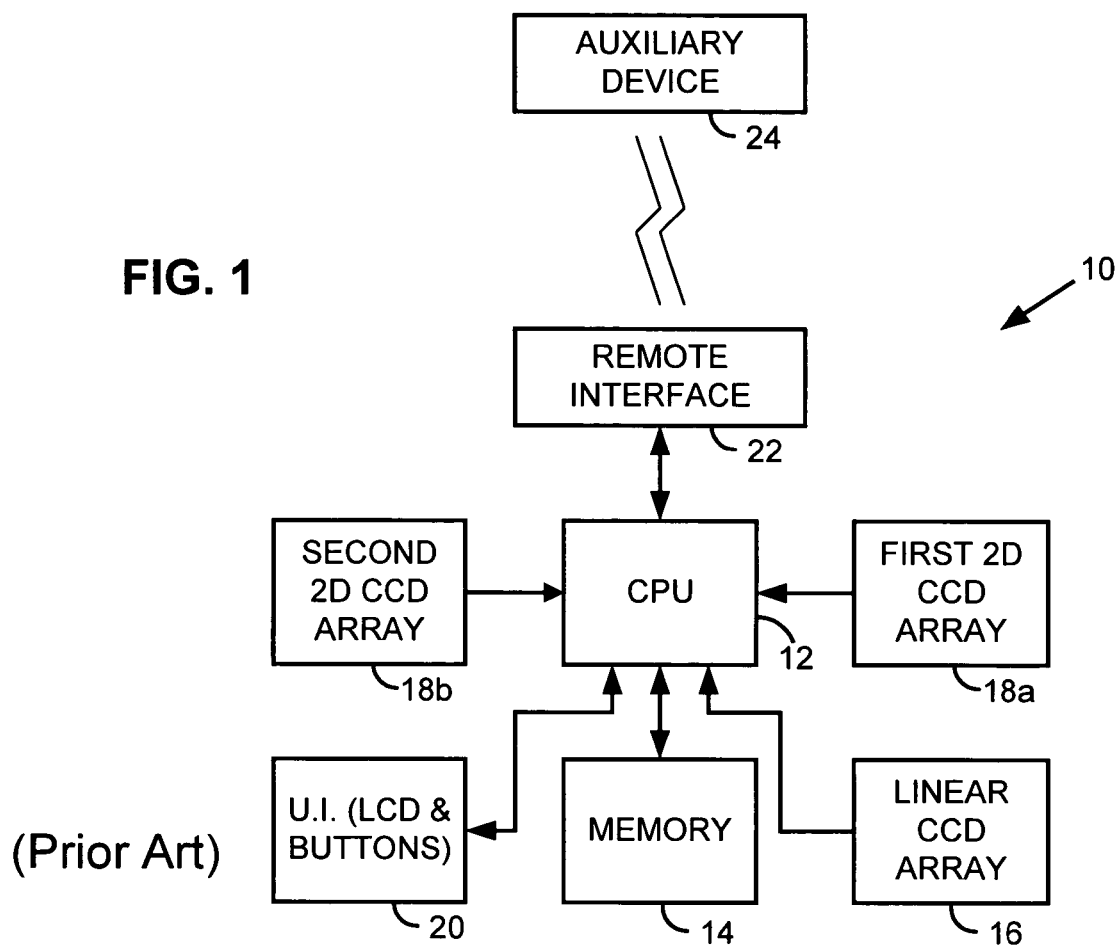
FIG. 1 is a block diagram of a prior art scanner that can be programmed to practice the techniques of the present invention.

As shown in FIG. 1, the CapShare scanner 10 includes a CPU 12, a memory 14, a linear CCD array 16, first and second 2D CCD arrays 18a, 18b, a user interface (including an LCD screen and associated buttons) 20, and an interface 22 (e.g., a serial port and an IRDA port/transceiver) to an auxiliary device 24. Although not particularly shown, each of the CCD sensors has an associated LED system for illuminating the object being imaged.

A further enhancement to the CapShare scanner is to provide a wireless Internet interface for interface 22, permitting direct communication between the device 10 and the Internet.

The linear sensor 16 operates in a conventional manner, acquiring successive pixilated line-scans of imagery under the scanner at a pixel data rate of about 18 Mbits/second (permitting full accuracy scanning even at instantaneous scanner motion speeds of up to 16 inches per second).

The two 2D CCDs 18a, 18b, are spaced apart, adjacent the linear sensor, and are used to track the scanner's movement. The areas scanned by these CCDs are illuminated obliquely by IR light, highlighting microscopic media surface features. The CPU identifies patterns in the surface features detected by each of these CCDs, and tracks their movement from one frame to the next to discern the movement of the two CCDs. By knowing the movement of the two CCDs, the movement of the scanner itself can be determined. This scanner motion information is used to re-map the swathed scan data acquired from the linear scanner array into composite pixel data with uniform scanline spacing. This remapped data is the final scan data that is typically provided to the end user or application.

The sizing of the linear and 2D CCD arrays is left to the designer. If 600 dpi line scan resolution is desired across a four inch scan swath, a 2400 element linear CCD would be used. The 2D CCDs are typically smaller in extent, e.g., having an aperture of 0.25 inches×0.25 inches. The spacing of the CCD elements is selected based on the size of surface features to be tracked.

The memory 14 includes both RAM and ROM. The RAM is used both for raw data storage, and for storage of final results. The scanner's operating system, pattern matching and data processing algorithms, and other program code are stored in the ROM.

In accordance with the illustrated embodiment, the ROM code also includes instructions for examining the final-result scan data (i.e., after re-mapping) for watermark data. In one particular embodiment, this is a two-step process. The final-result data is first screened by the CPU to determine whether it has certain hallmarks associated with watermarked data (e.g., the presence of a calibration signal, as detailed in the cited applications). If such hallmarks are found, a more computationally-intense watermark decoding algorithm is performed (e.g., of the sort described in the cited applications). By checking for watermark information in such a two-step process, CPU time isn't spent needlessly trying to extract a watermark from image data that apparently has no watermark.

In some embodiments, the watermark processing operation(s) occurs without user intervention—each time the raw scan data is processed and remapped into final-result form. In other embodiments, the watermark processing is invoked in response to a user command entered through the user interface 20. In still other embodiments, the watermark processing is invoked in response to a command provided to the scanner from an associated auxiliary device 24 (e.g., a local personal computer, a remote server computer, a specialized Internet appliance, etc.).

In some embodiments, the decoded watermark payload data is transferred to an associated auxiliary device whenever such data is detected. In other embodiments, the data is not sent unless the auxiliary device 24 first asks for it. Such an auxiliary device request may be made by a software program that is executing on the auxiliary device, e.g., through an API call.

A watermark decoded by the scanner can be presented to the user on the scanner's LCD display 20. Or the scanner can forward the decoded watermark to a remote device 24, which can then reply with supplemental data for presentation to the user. (Such arrangements for providing Internet-based content and controls in response to decoded watermarks are more particularly detailed in the present assignee's cited patent applications. In such applications, the scanner may serve the role of the client device, or the "originating device" as that term is used in the System For Linking From Objects To Remote Resources patent application.)

In some embodiments, the information obtained by the 2D CCDs 18a and/or 18b can be used to augment the information provided to the CPU so as to aid in the watermark detection/decoding process. For example, the 2D sensors provide 2D information immediately—without the time delay associated with remapping the 1D data from the linear CCD array into final form. This immediate 2D information may be analyzed for the presence of a calibration signal—perhaps shortening or obviating analysis for the calibration signal in the final data.

The 2D data can also be used to characterize the texture of the imaged substrate. Knowing the substrate texture allows the CPU to apply filtering or other watermark-enhancing/image enhancing steps as best fits the particular circumstance.

Figure 2:
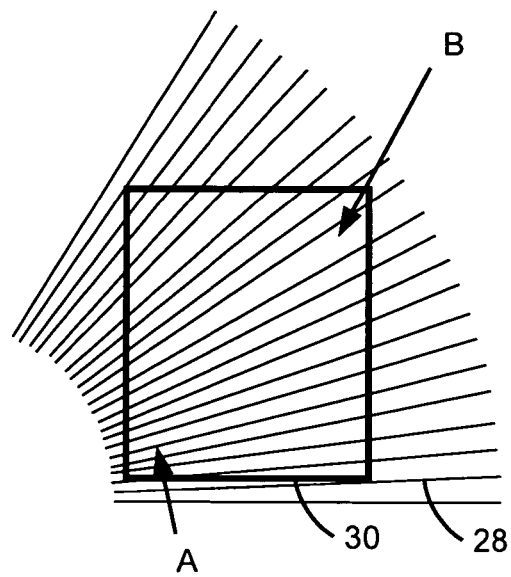
FIG. 2 shows an object being scanned along an arced path.

The 2D data also allows the CPU to assess the relative quality of different regions of line-scan data in the final scan data. In FIG. 2, an object 30 is scanned by a scanner 10 traveling an arced path, yielding successive lines of raw scan data 28. The geometry of the arc is revealed by data collected by the two 2D CCDs (which serve as motion encoders). Where the successive lines are spaced closer together (as at region A), the raw scan data is of higher resolution (relatively "oversampled"). In contrast, where the successive lines are spaced further apart (as at region B), the raw scan data is of lower resolution (relatively "undersampled"). In its screening or analysis for subtle watermark data, the CPU can be instructed to look first in region A, reasoning that the higher quality of the raw data in this region is most likely to include usable watermark information. (In some embodiments, watermark screening and/or detection may proceed by reference to the raw scan line data, rather than waiting for the data to be remapped into final form.)

Figure 3:
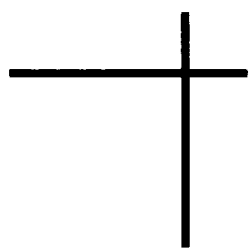
FIG. 3 shows how object warping may be detected.
Figure 3:
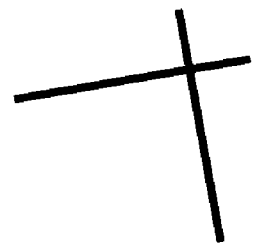

The two CCDs 18a, 18b also permit various binocular processing to be performed so as to enhance, or allow for more intelligent processing, of the linear scan data. Consider, for example, the case where the image being scanned doesn't convey a perfectly planar (e.g., rectilinear) signal. The substrate could be warped, or the image may have been printed in a skewed manner, or some other transformation may have taken place that creates an image that changes orientation/scale over its extent. One such example is shown in FIG. 3, which depicts a watermark calibration signal (here presented as an overt grid, for clarity of illustration). Each of the two 2D CCDs 18a, 18b senses a differently-oriented calibration signal. By reference to differences in the data sensed by the two spaced-apart CCDs, the CPU can infer scale, rotation, or other image transformation at intermediate points, and apply a compensation to the scan data so as to counteract such distortion.

Such compensation need not be based on a watermark calibration signal. Any other optically-sensed attribute at the two spaced-apart points may be used to infer the same, or related attributes, at intermediate positions, permitting appropriate compensation(s) to be applied.

Figure 4:
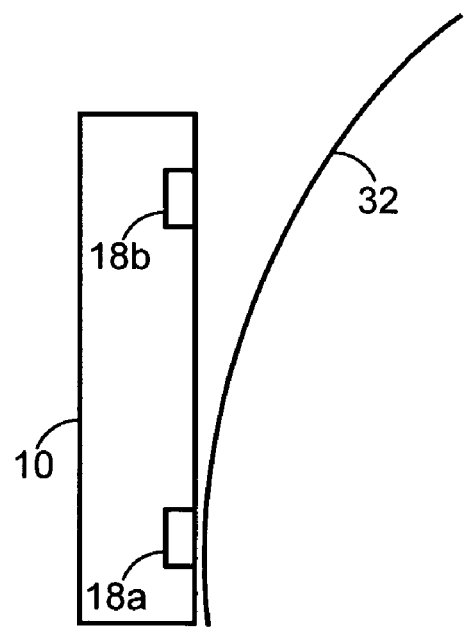
FIG. 4 shows use of binocular processing to determine certain object attributes.

Another application of the spaced-apart sensors 18 is to bi-optically determine the distance from the scanner to the object being imaged. Consider FIG. 4, which shows a scanner 10 with two spaced-apart CCD sensors 18a, 18b, imaging a warped object 32 (e.g., a warped paper substrate, or a curved object such as a drink can). In the depicted example, the first CCD 18a detects a very crisp image of surface texture or imagery, whereas the second CCD 18b detects an image similar to the first CCD, but blurred—as if low-pass filtered. Software instructions for CPU 12 can cause the scanner to recognize that the part of the object 32 under CCD 18a is immediately adjacent the scanner (and adjacent the nearby portion of the linear CCD array 16), whereas the part of the object under CCD 18b is spaced somewhat from the scanner.

Having information about the spacing of the object 32 from different parts of the linear sensor array permits certain compensations to be made in the data collected by the linear scanner. In the case of watermark detection, the CPU may recognize that data from the end of the linear scanner 16 remote from the object 32 will be devoid of meaningful high frequency information. In many watermark detection algorithms, the CPU can disregard data from such portion of the linear scanner—allowing it to focus on portions of the image data with the necessary high frequency components, thus producing more reliable results more quickly.

In other watermarking systems, two watermarks may be present—one conveyed in reliance on high frequency image components, and another encoded mostly with low frequency image components (i.e., in anticipation of circumstances where the object is imaged slightly out-of-focus). Upon recognizing that the linear scan data is weak in high frequency components, the CPU can be programmed to look just for the low frequency watermark data.

Just as the scanner 10 can perform watermark decoding, it can similarly perform barcode decoding. Conventional pattern-recognition algorithms can be applied by CPU 12 to either the raw or final scan data to identify barcode patterns. Once the pattern is identified, decoding is straightforward by applying known barcode alphabets. As in the watermark case, barcode decoding can be performed autonomously, or in response to user/auxiliary device command. Similarly, the decoded barcode data can be provided to the auxiliary device whenever detected, or in response to an auxiliary device query. The 2D data can likewise be used to augment the information provided to the CPU so as to aid in the barcode detection/decoding process.

In similar fashion, the above-described benefits associated by use of the two 2D CCDs can similarly be applied in the barcode context.

As earlier described, once the identifier information is extracted from the image data, Internet links can be based thereon to provide supplemental information, e-commerce opportunities, etc. In many implementations, the scanner UI 20 is used to present this supplemental information to the user, e.g. by software instructions that render HTML instructions for presentation on the UI display screen. The UI controls (e.g., buttons) can likewise be used to receive user instructions and commands, for linking back to the Internet.

To provide a comprehensive disclosure without unduly lengthening the specification, applicants incorporate by reference the patents and patent applications referenced above.

Having described and illustrated the principles of the technology with reference to specific implementations, it will be recognized that the technology can be implemented in many other, different, forms. For example, while reference has been made to software and program code, in other embodiments such functionality can naturally be provided by dedicated hardware devices. Similarly, while the technology has been described in the context of a dedicated hand scanner device, in other embodiments the technology can be implemented in other forms. Naturally, substitution of components and technologies is expected (e.g., CMOS sensors for CCDs).

The particular combinations of elements and features in the above-detailed embodiments are thus exemplary only. Moreover, the interchanging and substitution of these teachings with other teachings in this and the incorporated-by-reference patents/applications are also contemplated.

The invention claimed is:

1. In a scanner including a CPU, a memory, a linear sensor array, and first and second spaced-apart 2D sensor arrays serving as motion encoders, the CPU serving to process raw scan data collected by the linear sensor array from an imaged object into signal scan data in accordance with scanner motion data provided from said 2D sensors, an improvement comprising software instructions in the memory causing the scanner to discern a machine-readable identifier from scan data acquired from the object, wherein said software instructions cause the CPU to process data from the 2D sensor arrays for a purpose in addition to sensing scanner motion, wherein said additional purpose includes beginning a watermark detection process before data from the linear sensor array is finally processed.

2. The scanner of claim 1 in which said additional purpose includes beginning to sense a watermark calibration signal.

3. In a scanner including a CPU, a memory, a linear sensor array, and first and second spaced-apart 2D sensor arrays serving as motion encoders, the CPU serving to process raw scan data collected by the linear sensor array from an imaged object into signal scan data in accordance with scanner motion data provided from said 2D sensors, an improvement comprising software instructions in the memory causing the scanner to discern a machine-readable identifier from scan data acquired from the object, wherein said software instructions cause the CPU to process data from the 2D sensor arrays for a purpose in addition to sensing scanner motion, wherein said additional purpose includes identifying portions of the data collected by the linear sensor array that are relatively more likely to include detectable identifier data.

4. In a scanner including a CPU, a memory, a linear sensor array, and first and second spaced-apart 2D sensor arrays serving as motion encoders, the CPU serving to process raw scan data collected by the linear sensor array from an imaged object into signal scan data in accordance with scanner motion data provided from said 2D sensors, an improvement comprising software instructions in the memory causing the scanner to discern a machine-readable identifier from scan data acquired from the object, wherein said software instructions cause the CPU to process data from the 2D sensor arrays for a purpose in addition to sensing scanner motion, wherein said additional purpose includes quantifying an object surface characteristic, wherein a filter can be applied to said scan data in accordance therewith.

5. In a scanner including a CPU, a memory, a linear sensor array, and first and second spaced-apart 2D sensor arrays serving as motion encoders, the CPU serving to process raw scan data collected by the linear sensor array from an imaged object into signal scan data in accordance with scanner motion data provided from said 2D sensors, an improvement comprising software instructions in the memory causing the scanner to discern a machine-readable identifier from scan data acquired from the object, wherein said software instructions cause the CPU to process data from the 2D sensor arrays for a purpose in addition to sensing scanner motion, wherein said additional purpose includes assessing relative distance to the object from different portions of the scanner.

6. In a scanner including a CPU, a memory, a linear sensor array, and first and second spaced-apart 2D sensor arrays serving as motion encoders, the CPU serving to process raw scan data collected by the linear sensor array from an imaged object into signal scan data in accordance with scanner motion data provided from said 2D sensors, an improvement comprising software instructions in the memory causing the scanner to discern a machine-readable identifier from scan data acquired from the object, wherein said software instructions cause the CPU to process data from the 2D sensor arrays for a purpose in addition to sensing scanner motion, wherein said additional purpose includes quantifying an affine distortion in the scan data, so that compensation may be applied therefor.

7. In an apparatus comprising a multi-element sensor array, a memory, a CPU, and a visual output device, the apparatus producing sensor data from signals provided from the sensor array, the memory including program instructions causing the CPU to control the visual output device, at least in part, in accordance with information decoded from the sensor data, an improvement wherein the program instructions further cause the CPU to examine said sensor data for the presence of a calibration signal by which information about the scale or rotation of steganographic watermark data can be determined.

8. In an apparatus comprising a multi-element sensor array, a memory, a CPU, and a visual output device, the apparatus producing sensor data from signals provided from the sensor array, the memory including program instructions causing the CPU to control the visual output device, at least in part, in accordance with information decoded from the sensor data, an improvement wherein the program instructions further cause the CPU to:

employ a first technique to examine said sensor data for attribute information useful in guiding possible subsequent decoding of the sensor data to discern plural-bit steganographic watermark information therefrom, said attribute information comprising physical texture information; and employ a second technique to attempt to decode plural-bits of steganographic watermark information from said sensor data, said second technique being determined at least in part by said attribute information.

9. In an apparatus comprising a multi-element sensor array, a memory, a CPU, and a visual output device, the apparatus producing sensor data from signals provided from the sensor array, the memory including program instructions causing the CPU to control the visual output device, at least in part, in accordance with information decoded from the sensor data, an improvement wherein the program instructions further cause the CPU to:

employ a first technique to identify one or more portions of said sensor data that appear most promising for decoding steganographic watermark data therefrom, wherein said first technique comprises identifying a portion of said sensor data that is sampled at a higher sampling rate than other portions.

10. In an apparatus comprising a multi-element sensor array, a memory, a CPU, and a visual output device, the apparatus producing sensor data from signals provided from the sensor array, the memory including program instructions causing the CPU to control the visual output device, at least in part, in accordance with information decoded from the sensor data, an improvement wherein:

the apparatus comprises two spaced-apart multi-element sensor arrays, operating simultaneously rather than alternately; and said program instructions cause said CPU to exploit, in a binocular fashion, the different views of an object being sensed to improve the decoding of information from said sensor data.

11. In an apparatus comprising a multi-element sensor array, a memory, a CPU, and a visual output device, the apparatus producing sensor data from signals provided from the sensor array, the memory including program instructions causing the CPU to control the visual output device, at least in part, in accordance with information decoded from the sensor data, an improvement wherein:

the apparatus comprises two spaced-apart multi-element sensor arrays; and said program instructions cause said CPU to exploit the different views of an opbject being sensed to improve the decoding of information from said sensor data;

wherein said program instructions cause the CPU to determine an optically-sensed attribute corresponding to each of the spaced-apart multi-element sensor arrays, and to use said attribute in determining a compensation to be applied to said sensor data prior to decoding of the information therefrom.

12. In an apparatus comprising a multi-element sensor array, a memory, a CPU, and a visual output device, the apparatus producing sensor data from signals provided from the sensor array, the memory including program instructions causing the CPU to control the visual output device, at least in part, in accordance with information decoded from the sensor data, an improvement wherein:

the apparatus comprises two spaced-apart multi-element sensor arrays; and said program instructions cause said CPU to exploit the different views of an opbject being sensed to improve the decoding of information from said sensor data;

wherein said program instructions cause the CPU to attempt to decode plural-bit steganographic watermark information from said sensor data, exploiting said different views.

13. The apparatus of claim 12 wherein said program instructions cause said CPU to sense calibration signals in sensor data corresponding to each of said spaced-apart sensors, to determine a compensation to be applied to said sensor data before attempting to decode the plural-bit steganographic watermark information therefrom.

* * * * *